(12) United States Patent
Wang et al.

(10) Patent No.: US 11,477,184 B2
(45) Date of Patent: *Oct. 18, 2022

(54) CONDUCTING SECURE INTERACTIONS UTILIZING RELIABILITY INFORMATION

(71) Applicant: Visa International Service Association, San Francisco, CA (US)

(72) Inventors: Quan Wang, Foster City, CA (US); Kelvan Howard, San Francisco, CA (US); Jerry Wald, San Francisco, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 16/912,437

(22) Filed: Jun. 25, 2020

(65) Prior Publication Data

US 2020/0329023 A1 Oct. 15, 2020

Related U.S. Application Data

(63) Continuation of application No. 15/806,287, filed on Nov. 7, 2017, now Pat. No. 10,735,395.

(51) Int. Cl.
*G06F 7/04* (2006.01)
*G06F 15/16* (2006.01)
(Continued)

(52) U.S. Cl.
CPC .............. *H04L 63/08* (2013.01); *H04L 9/006* (2013.01); *H04L 9/3239* (2013.01);
(Continued)

(58) Field of Classification Search
CPC ....... H04L 63/08; H04L 9/006; H04L 9/3239; H04L 63/0435; H04L 9/0861; H04L 2209/38; H04L 63/04; H04W 12/66
See application file for complete search history.

(56) References Cited

U.S. PATENT DOCUMENTS 10,735,395 B2 8/2020 Wang et al.
2007/0174249 A1 7/2007 James
(Continued)

OTHER PUBLICATIONS

U.S. Appl. No. 15/806,287, "Non-Final Office Action", dated Sep. 20, 2019, 11 pages.
(Continued)

*Primary Examiner* — Trong H Nguyen
(74) *Attorney, Agent, or Firm* — Kilpatrick Townsend & Stockton LLP

(57) ABSTRACT

Embodiments of the invention are directed assessing reliability between two computing devices. A distributed database may maintain reliability associations between pairs of computing devices. Each reliability association may indicate a particular device has determined (e.g., locally) that another device is reliable. In order to determine an amount of reliability between a first computing device and a second computing device, an ordered combination of the reliability associations may be determined utilizing the distributed database. The ordered combination of reliability associations may identify a reliability path between the first computing device and the second computing device. An amount of reliability may be determined based on the reliability path. An interaction between the devices may be allowed or restricted based at least in part on the amount of reliability between the computing devices.

16 Claims, 5 Drawing Sheets

(51) Int. Cl.
*H04L 29/06* (2006.01)
*H04L 9/40* (2022.01)
*H04L 9/00* (2022.01)
*H04L 9/32* (2006.01)
*H04L 9/08* (2006.01)

(52) U.S. Cl.
CPC ........ *H04L 63/0435* (2013.01); *H04L 9/0861* (2013.01); *H04L 9/50* (2022.05)

(56) References Cited

U.S. PATENT DOCUMENTS

| | | | |
|---|---|---|---|
| 2010/0082828 A1* | 4/2010 | Jennings | H04L 63/08 370/352 |
| 2011/0055897 A1* | 3/2011 | Arasaratnam | G06F 21/6218 726/3 |
| 2013/0019317 A1 | 1/2013 | Whelan et al. | |
| 2013/0142241 A1 | 6/2013 | Tanikawa | |
| 2013/0198811 A1 | 8/2013 | Yu et al. | |
| 2016/0073271 A1 | 3/2016 | Schultz et al. | |
| 2017/0289797 A1* | 10/2017 | Bae | H04W 12/041 |
| 2017/0293873 A1 | 10/2017 | Chrapko | |
| 2019/0066119 A1* | 2/2019 | Sengupta | G06Q 30/0282 |

OTHER PUBLICATIONS

U.S. Appl. No. 15/806,287, "Notice of Allowance", dated Apr. 1, 2020, 14 pages.
PCT/US2018/046072, "International Preliminary Report on Patentability", dated May 22, 2020, 9 pages.
PCT/US2018/046072, "International Search Report and Written Opinion", dated Nov. 13, 2018, 15 pages.
Application No. EP18875821.3, Extended European Search Report, dated Oct. 27, 2020, 9 pages.
Luzio et al., "Consensus Robustness and Transaction De-Anonymization in the Ripple Currency Exchange System", Proceedings of the International Conference on Distributed Computing System, Jun. 5, 2017, pp. 140-150.
Sherwood et al., "Cooperative Peer Groups in NICE", Computer Networks, vol. 50, No. 4, 2006, pp. 523-544.

* cited by examiner

CONDUCTING SECURE INTERACTIONS UTILIZING RELIABILITY INFORMATION

The present application is a continuation of U.S. patent application Ser. No. 15/806,287, filed on Nov. 7, 2017, the entire contents of which are hereby incorporated by reference for all purposes.

BACKGROUND

Embodiments of the invention are directed to systems and methods related to conducting secure message exchanges.

The Internet has made it increasingly easy for electronic interactions to be conducted between computing devices (e.g., mobile phones, tablet computers, etc.). However, it has also increased the risks of fraudulent interactions, as well as the risk of data being compromised. Thus, it can be difficult to be ascertain whether messages received from an unknown device are reliable.

To mitigate such uncertainty, some conventional systems use digital certificates in message exchanges. The digital certificates are issued by and verifiable by a certificate authority. Digital certificates can be used to verify that a person or device that is sending a message is what is who it says it is. In some other systems, message exchanges require that a token such as a password or secret be verified by between two devices before they can communicate. Knowledge of the password or secret by an unknown device can demonstrate to another device that the unknown device can be trusted.

While such conventional trust systems are effective, a number of improvements can be made. For example, two devices that are not directly connected and have not agreed to a common authentication or trust scheme may not interact with each other, despite the possibility that the message exchanges between such devices may have a legitimate and honest purpose. For instance, a car made by a car manufacturer may wish to communicate with a watch made by a watch manufacturer. These devices may have the ability to communicate with external devices, but the car and the watch may not have agreed to communicate according to a predetermined authentication and/or trust protocol. Thus, there is a need for improved techniques for assessing the reliability of devices so that they may communicate and/or interact with each other, despite the fact that they may not have prior knowledge of each other's trustworthiness.

Embodiments of the invention address these and other problems, individually and collectively.

BRIEF SUMMARY

One embodiment of the invention is directed to a method. The method comprises determining, by a first computing device, an ordered combination of reliability associations identifying a reliability path of computing devices comprising a plurality of computing devices, the reliability path comprising the first computing device and a second computing device. In some embodiments, the reliability path may be determined from a distributed database comprising data identifying a plurality of reliability relationships between pairs of computing devices. The method may further comprise determining, by the first computing device, an amount of reliability between the first computing device and the second computing device, the amount of reliability being based at least in part on the reliability path. The method may further comprise determining, by the first computing device, whether to interact with the second computing device based at least in part on the amount of reliability between the first computing device and the second computing device.

Another embodiment of the invention is directed to a computing device comprising a processor and a computer readable medium coupled to the processor. The computer readable medium may comprise code for causing the processor to perform operations. The operations comprise determining an ordered combination of reliability associations identifying a reliability path of computing devices comprising a plurality of computing devices, the reliability path comprising the computing device and a separate computing device. In some embodiments, the reliability path may be determined from a distributed database comprising data identifying a plurality of reliability relationships between pairs of computing devices. The embodiments may further comprise determining an amount of reliability between the computing device and the separate computing device, the amount of reliability being based at least in part on the reliability path. The method may further comprise determining whether to interact with the separate computing device based at least in part on the amount of reliability between the computing device and the separate computing device.

Another embodiment of the invention is directed to a blockchain provider computer for performing blockchain and/or smart contract operations discussed herein.

DETAILED DESCRIPTION

Figure 1:
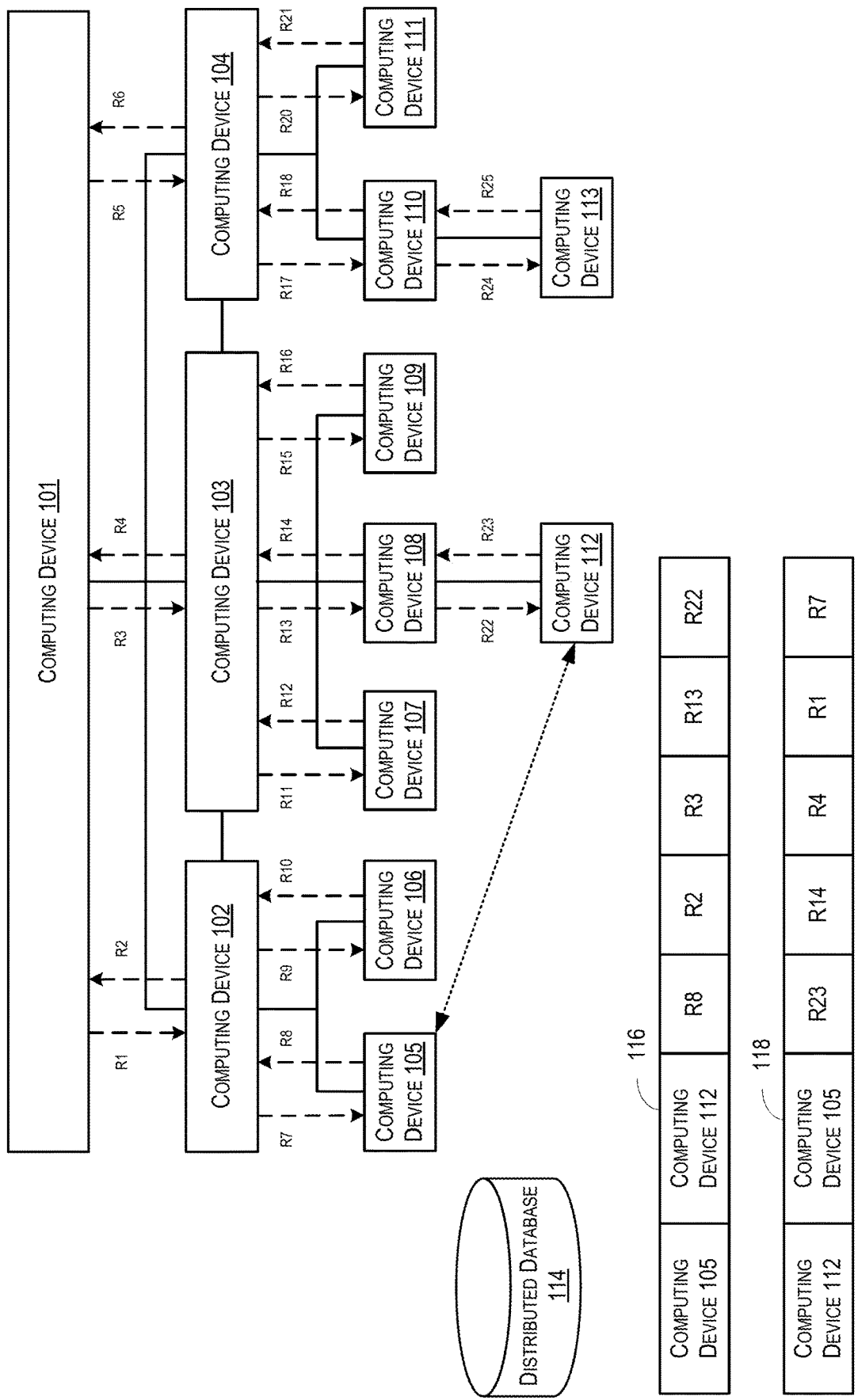
FIG. 1 depicts a block diagram of an exemplary system for determining a reliability path between two computing devices, according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing the details of some embodiments of the present invention, description of some terms may be helpful in understanding the various embodiments.

An "electronic device," may be any device that accomplishes its purpose electronically. An electronic device may have multiple functions. For example, an electronic device may have a primary function and one or more secondary functions. A primary function may be the function that most closely aligns with the electronic device's purpose. An example of an electronic device may be a computing device.

A "computing device" may be any suitable electronic device capable of communicating with, and/or interacting with other devices. Examples of computing devices may include a mobile phone, a smart phone, a personal digital assistant (PDA), a laptop computer, a desktop computer, a server computer, a vehicle (e.g., an automobile), a thin-client device, a router, a modem, a tablet PC, a printer, etc. Additionally, computing devices may be any type of wearable technology device, such as a watch, earpiece, glasses, etc. The computing device may include one or more processors capable of processing input. The computing device may also provide remote communication capabilities to a network. Examples of remote communication capabilities include using a mobile phone (wireless) network, wireless data network (e.g., 3G, 4G or similar networks), Bluetooth, Bluetooth Low Energy (BLE), Wi-Fi, Wi-Max, or any other communication medium that may provide access to a network such as the Internet or a private network. A computing device may be associated with a username, a password, a device identifier, one or more asymmetric keys that may be used for asymmetric encryption, one or more symmetric keys that may be used for symmetric encryption, or the like. A computing device may be configured to access and/or manage a distributed database (e.g., a blockchain).

A "device identifier" may include any suitable distinctive set of characters used to identify a device. An exemplary device identifier may include any suitable number or type of characters (e.g., numbers, graphics, symbols, or other information) that may uniquely represent a device. By way of example, a device identifier may be a serial number, partial serial number, a media access control address, a device name/nickname, a network address at which the device may be found, or the like.

A "blockchain" may be a distributed database that may be used to maintain a continuously growing list of records, called blocks. In some implementations, each block contains a timestamp and a link to a previous block. A blockchain is typically managed by a peer-to-peer network collectively adhering to a protocol for validating new blocks. Once recorded, the data in any given block cannot be altered retroactively without the alteration of all subsequent blocks and the collusion of the network. This allows the blockchain to serve as a data record between parties that is both verifiable and permanent. A blockchain may be spread out over a plurality of nodes (e.g., of a distributed computing system).

A "smart contract" may be a computer protocol intended to facilitate, verify, or enforce the performance of a set of rules. It may include a technology feature of a blockchain. In some embodiments, a smart contract of a blockchain may be visible to each participant of the blockchain. Smart contracts can be used to determine reliability paths, to determine how to quantify reliability between two devices, to obtain a credential associated with a computing device, to determine/provide instructions on generating a symmetric cryptographic key, or the like.

"Asymmetric keys," also known as public/private key pairs, are used for asymmetric encryption. A transmitting computing device may utilize its private key to encrypt a message, and the message may only be decrypted by a receiving computing device using the public key of the transmitter. In a public-key encryption system, a computing device can encrypt a message using the public key of the receiver, but such a message can be decrypted only with the receiver's private key. Public-key cryptography systems often rely on cryptographic algorithms based on mathematical problems that currently admit no efficient solution.

A "symmetric cryptographic key," also referred to as a "symmetric key" is a cryptographic key that is used for symmetric encryption. That is, a symmetric key may be used for both encryption of plain text and decryption of cipher text. For example, a transmitting computing device may encrypt a message using the symmetric key and a receiving computing device may decrypt the encrypted message using the same symmetric key. The symmetric key, in practice, represents a shared secret between two or more computing devices that can be used to maintain private information.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

Details of some embodiments of the present invention will now be described.

Embodiments of the invention are directed to assessing reliability (e.g., trust) between two computing devices that are previously unknown to one another. In some embodiments, any suitable number of computing devices may participate in a distributed database (e.g., a blockchain). Within the distributed database, reliability associations related to pairs of computing device may be maintained. By way of example, computing device A may have previously determined the reliability of a computing device B and a computing device C. Trust may have been established through any suitable mechanism including, but not limited to, authentication token exchanges, digital certificates, the number prior error free interactions, etc. Thus, the computing device A may consider both computing device B and computing device C to be trusted devices. Accordingly, the distributed database may be utilized to maintain a reliability association indicating that computing device A trusts computing device B and another reliability association indicating that computing device A trusts computing device C. The degrees of reliability (e.g., reliability amounts) between the pairs of devices may also be maintained (e.g., stored) in the distributed database. As a non-limiting example, devices A and B may have interacted one hundred times without error, and devices A and C may have interacted ten times without error. The interaction between A and B may have a reliability value of nine on a scale of one to ten, while the interaction between A and C may have a reliability value of 6 on the scale.

In a similar vein, computing device D, having previously assessed the reliability of computing device E, may consider computing device E to be a trusted device. The distributed database may be utilized to maintain a reliability association indicating that the computing device D trusts the computing device E. It should be appreciated that, in some embodiments, the reliability associations maintained by the distributed database may indicate unidirectional trust. That is, one association may indicate trust by a first computing device of a second computing device, while a different association may indicate trust by the second computing device of the first computing device.

Conventionally, it would be difficult for computing device C to assess the reliability of computing device E as those devices are not directly connected and/or have not previously assessed one another's trustworthiness. This is particularly true if computing device C and computing device E were made by different manufacturers using different hardware and software. Embodiments of the invention address this issue by providing a means to make this assessment utilizing the reliability associations maintained in the distributed database. For example, a protocol (e.g., a smart contract) may be included as a feature of the distributed database (e.g., a blockchain). Utilizing this protocol, a reliability path between computing device C and computing device E may be determined from local reliability associations maintained in the distributed database. Once a reliability path is determined, the protocol may dictate whether the reliability path meets particular criteria (e.g., less than a threshold number of device in the reliability path, the reliability path is scored with a reliability value that is over a threshold amount, there are no associations within the path that fall below a minimum amount of reliability, etc.). If the reliability path meets the criteria, the reliability of the path between computing device E and computing device C may be confirmed. This is true even though computing devices C and E may not have previously interacted or have communicated with a central authority such as a certificate authority.

In some embodiments, the protocol may specify that each (or some portion) of the devices included in the reliability path be queried to confirm that a corresponding reliability association is valid and/or to provide a credential (e.g., a public key, a certificate, an alphanumeric token, etc.). Each of the credentials obtained may be combined according to the protocol set to generate a symmetric key which computing device C and computing device E may utilize in subsequent interactions. Examples of such systems are disclosed in PCT application number PCT/US2017/059371, filed on Oct. 31, 2017, titled "CRYPTOGRAPHIC KEY GENERATION SYSTEM AND METHOD", the entire disclosure of which is herein incorporated by reference.

By utilizing the techniques described above, computing devices may determine and verify reliability of a previously-unknown device utilizing indirect reliability associations which decreases the likelihood of fraudulent interactions and enables the devices to interact in a secure manner.

FIG. 1 depicts a block diagram of an exemplary system 100 for determining a reliability path between two computing devices, according to some embodiments. The system 100 includes computing devices 101-113 (hereinafter "the computing devices), although any suitable number of computing devices may be utilized. Each of the computing devices may be in operative communication with each other via any suitable communication medium using any suitable communications protocol.

Suitable communications media for communications between the components shown in FIG. 1 may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, Bluetooth, Bluetooth Low Energy (BLE), and/or the like); and/or the like.

Messages between the computing devices of FIG. 1 may be transmitted using a communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

Each of the computing devices may include any suitable electronic device capable of accessing the Internet, such as a personal computer, cellular or wireless phones, personal digital assistants (PDAs), tablet computers, laptop computers, handheld specialized readers, routers, modems, payment processing network computers, server computers, certificate authority computers, computers participating in a public key infrastructure, or the like. Other examples of computing devices are described above.

In some embodiments, each of the computing devices may be configured to assess reliability of other computing devices according to a reliability scheme. By way of example only, the computing device 101 may be a federated system that determines and establishes local reliability associations (e.g., trust) between the computing device 101 and the computing device 102-104. The computing device 102 may be configured to determine and establish local reliability associations/trust between the computing device 102 and the computing devices 105-106. The computing device 103 may be configured to determine and establish local reliability associations/trust between the computing device 103 and computing devices 107-109. The computing device 104 may be configured to determine and establish local reliability associations/trust between the computing device 104 and computing devices 110 and 111. The computing device 108 may be configured to determine and establish a local reliability associations/trust between the computing device 108 and one or more other computing devices, such as computing device 112. The computing device 110 may be configured to determine and establish a local reliability associations/trust between the computing device 110 and one or more other computing devices, such as computing device 113.

Each of the reliability associations R1-R25 depicted in FIG. 1 is intended to illustrate a local reliability association. These reliability associations may be unidirectional in this example (they could be bi-directional in other examples). Additionally, each reliability association may be known only between the pair of computing devices of the local association and conventionally unknown to the other computing devices depicted. For example, R1 is intended to depict a local reliability association indicating that computing device 101 has determined and established the reliability of computing device 102 and, thus, considers the computing device 102 to be a reliable/trusted device. The local reliability association R1 may be known by the computing device 101 (and in some cases, the computing device 102), may be unknown with respect to computing devices 103-113. It should be appreciated that each of the reliability associations R1-R25 may be determined/established by any suitable means. For example, a reliability relationship (e.g., an association between a pair of devices that includes data that describes the relationship) may be determined/established by executing a know-your-customer protocol, by receiving/assessing/verifying data professing the identity of the computing device/or user associated with the computing device, by executing a registration protocol that gathers/verifies identification information of the computing device/user, by executing an authentication protocol that obtains/verifies a username/password, or by any suitable means apparent to one skilled in the art of establishing trust relationships.

In some embodiments, the computing devices 101-113 may be communicatively coupled to a distributed database 114. The distributed database 114 (e.g., a blockchain), may be utilized to maintain records containing the local reliability associations R1-R25. The computing devices may provide their respective local reliability associations to the distributed database 114 according to any suitable means. By way of example, a protocol set (e.g., a smart contract) included as a feature of the distributed database 114 may be executed to cause request messages to be transmitted to each of the computing device in order to obtain the computing devices respective local reliability associations. As another example, as a local trust reliability association is establish, or at any suitable time, a computing device of FIG. 1 may be configured to report the local trust reliability association to the distributed database 114.

As a non-limiting example, a computing device 105 may desire interaction with computing device 112. Computing device 105 and computing device 112 may not have previously interacted with each other (or do not share a common authentication or trust scheme), and may have been made by different manufacturers according to different specifications and configurations. The computing device 105 may determine an amount of reliability corresponding to the computing device 112 by utilizing the distributed database 114. In some embodiments, the computing device 112 may submit a request to the protocol set of the distributed database 114 (e.g., a smart contract) to determine a reliability of the computing device 112. Upon receiving the request, the protocol set may be configured to cause a processor in one or more of the devices depicted in FIG. 1 to execute code to determine a reliability path from the computing device 105 to the computing device 112 from the local reliability associations stored in the distributed database 114.

In the example depicted in FIG. 1, the distributed database may determine that reliability path 116 exists from the computing device 105 to the computing device 112. The reliability path 116 may be determined from the local reliability associations R8, R2, R3, R13, and R22. If the computing device 112 was to attempt an interaction with the computing device 105, a reliability path 118 may similarly be determined. The reliability path 118 may include, for example, the local reliability associations R23, R14, R4, R1, and R7.

In some embodiments, the protocol set (e.g., a smart contract) may cause each (or some portion) of the local reliability associations of the reliability path 116 to be verified. For example, a message may be transmitted to the computing device 105 to verify the local reliability association R8. The computing device 105 may be configured to provide a response message that confirms or denies the validity of the local reliability association R8. In some embodiments, the computing device 105 may be configured to include additional information such as a public key, certificate (including a public key), a token, or any suitable credential. In some embodiments, the provided information may be combined to form a symmetric key with which the computing device 105 and the computing device 112 may communicate. Because both devices have access to the distributed database 114 and its associated protocol set, the symmetric key can be obtained by both computing devices in the manner described herein and, thus, each computing device can validate the integrity of the symmetric key.

By utilizing the techniques described in FIG. 1, two computing devices that have no previous relationship may interact in a secure manner with some assurance (based on the local reliability associations forming the reliability path) that the other computing device is reliable.

Figure 2:
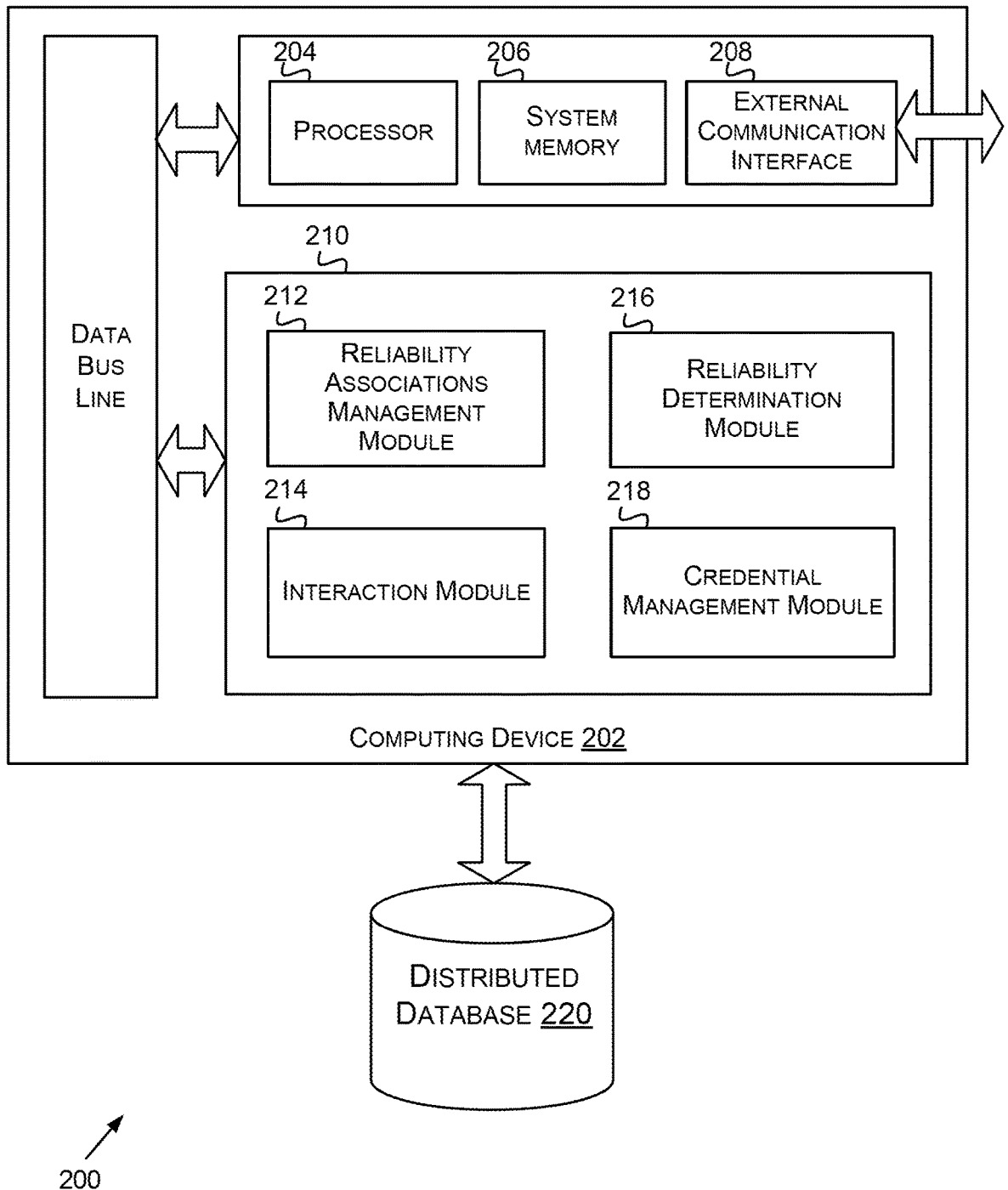
FIG. 2 depicts a block diagram of an exemplary computing device according to some embodiments.

FIG. 2 depicts a block diagram 200 of an exemplary computing device 202, according to some embodiments. The computing device 202 is intended to be an example of any of the computing device 101-113 of FIG. 1. The computing device 202 may comprise a processor 204, which may be coupled to a system memory 206 and an external communication interface 208. A computer readable medium 210 may also be operatively coupled to the processor 204.

The computer readable medium 210 may comprise a number of software modules including a reliability associations management module 212, an interaction module 214, a reliability determination module 216, and a credential management module 218. Although these various modules are depicted as being internal to the computing device 202, any number of these modules may instead be implemented as separate systems external to the computing device 202.

In at least one embodiment, the reliability associations management module 212 may comprise code that, when executed, causes the processor 204 to establish a local reliability assocation with another computing device. By way of example, the reliability associations management module may be configured to cause the processor 204 to request and receive from the other computing device public/private key pairs, tokens, credentials, username/password, or any suitable identity information. At a suitable time, the reliability associations management module 212 may assess, using conventional methods, the received information to determine reliability of the other computing device. If the assessment indicates that the other computing device is reliable (e.g., trustworthy), the reliability associations management module 212 may be configured to store a corresponding local reliability association within the distributed database 220, a database configured to stored such information. The distributed database 220 may be an example of the distributed database 114 of FIG. 1. The storage of the local reliability association may be triggered by the reliability associations management module 212 or the storage of the local reliability association may be triggered by a request received by the reliability associations management module 212 (e.g., from the distributed database 220).

In at least one embodiment, interaction module 214 may be configured to cause the processor 204 to determine that an interaction with another computing device is desireable. By way of example only, data may be received by the processor 204 (e.g., from an application or a user interface provided on the computing device 202) that indicates a message is to be transmitted. As non-limiting examples, data may be related to a payment transaction or an access request to a security system. Upon receipt of the data, or at another suitable time, the interaction module 214 may be configured to cause the processor 204 to execute code associated with the reliability determination module 216.

In some embodiments, interaction module 214 may be configured to cause the processor 204 to transmit and receive messages to/from another computing device. Upon receipt of a message, or prior to transmission of a message, or at another suitable time, the interaction module 214 may be configured to cause the processor 204 to execute code assocaited with the reliability determination module 216.

In some embodiments, the reliability determination module 216 may be configured to cause the processor 204 to a request for a reliability assessment of the other computing device. In some embodiments, request may identify the transmitting computing device and the receiving computing device. A protocol set (e.g., a smart contract) may be included as a feature of the distributed database 220. Upon receiving a realibility assessment request, the protocol set may cause a realibility path to be determined from local reliability associations stored within the distributed database 220.

In some embodiments, the reliability determination module 216 may be configured to determine a reliability path utilizing the reliability associations stored in the distributed database 220. For example, the reliability determination module 216 may search each reliability association to determine one or more reliablity paths between two computing devices.

It should be appreciated that, in some embodiments, the reliability path (e.g., determined by the smart contract or the reliability determination module 216) that is utilized for subsequent processing may be selected from a set of potential reliability paths between the computing devices. In some embodiments, the reliability path is selected based on a comparison between the set of potential reliability paths. A reliability path that includes a smaller number of computing devices may be determined to be a better reliablity path than one that includes a greater number of computing devices. Additional factors may be assessed when determining what reliability path to select. For example, reliability data related to the reliability association may specify certain scenarios/conditions for which a computing device is deemed reliable and/or other scenarios/conditions for which a computing device is deemed unreliable. The greater the number of scenarios/conditions for which a number of computing devices in the path are deemed unreliable, the weaker the reliability of the path. While a reliability path with a large number of scenarios/conditions for which a number of the computing devices in the path are deemed reliable may indicate a stronger reliablity path. The smart contract associated with the distributed database 220 and/or the reliability determination module 216 may be configured with the protocol for assessing the strength of a reliability path and selecting a particular reliability path from a set of reliability paths.

In response to receiving a reliability assessment request, the protocol set (e.g., the smart contract) may cause a response to be transmitted to the reliability determination module 216. The response may be in any suitable form. In some embodiments, the response may include information indicating an amount of reliability (e.g., as determined based on the selected reliability path) of a computing device. Additionally, or alternatively, the response may include an indication that the computing device is reliable or that the computing device is not reliable. In still further examples, the response may include a credential generated according to the protocol set. The generation of the credential is discussed in further detail with respect to FIG. 5.

Upon receiving a response from the distributed database 220 indicating an amount of reliability of the computing device, or in response to determining an amount of reliability, the reliability determination module 216 may be configured to cause the processor 204 to proceed with or halt the interaction. In examples where the computing device 202 is attempting to transmit a message to a receiving computing device, the response may cause the processor 204 to proceed with transmission when the response indicates that the receiving computing device is reliable (e.g., by indication, when the amount of reliability meets or exceeds a threshold value, etc.). In some embodiments, the processor 204 may include in the transmitted message a credential generated by and received from the distributed database 220. In other embodiments, the credential may be generated by the reliability determination module 216 according to the protocol set associated with the distributed database 220 and included in the transmitted message. If the response indicates that the intended receiving computing device is not reliable (e.g., by indication, when the amount of reliability is less than the threshold value, etc.) then the message transmission may be halted. Credential generation may be discussed in more detail below with respect to FIG. 5.

In examples in which the computing device 202 is receiving a message from a transmitting computing device (e.g., via execution of the functionality assocaited with the interaction module 214), the reliability determination module 216 may be configured to cause the processor 204 to transmit a reliability assessment request to the distributed database 220 as discussed above. Alternatively, a reliability assessment may be performed by the processor 204 by executing code associated with the reliability determination module 216. The reliability determination module 216 may be configured to cause the processor 204 to proceed with processing the message when the response from the distributed database 220 (or an amount of reliability calculated by the reliability determination module 216) indicates that the transmitting computing device is reliable (e.g., by indication, when the amount of reliability is less than the threshold value, etc.). If the response indicates that the transmitting computing device is not reliable (e.g., by indication, when the amount of reliability is less than the threshold value, etc.) then reliability determination module 216 may be configured to cause the processor 204 to cease processing the message or to execute one or more other actions.

In some embodiments, the message may include a credential (e.g., an encryption key such as a symmetric key that be utilized to encrypt/decrypt message between two devices) provided by the transmitting device. The credential may correspond to each (or some portion) of the devices in the reliability path determined between the transmitting computing device and the receiving computing device. In these embodiments, upon receipt of the message, the credential management module 218 may be configured to cause the processor 204 to extract the credential (e.g., the symmetric key) from the message and transmit a verification request to the distributed database 220. Upon receipt of the verification request, functionality corresponding to the protocol set associated with the distributed database 220 may be executed to confirm that the credential is valid (e.g., properly generated according to the protocol set). According to the protocol set, the distributed database 220 may be configured to provide a verification response indicating whether the credential provided is valid. In some embodiments, the reliability determination module 216 may be configured to cause the processor 204 to verify the credential according to the protocol set associated with the distributed database 220 by utilizing the reliability associations contained in the distributed database 220. In some embodiments, the credential management module 218 may be configured to cause the processor 204 to proceed with processing the message when the response indicates (or the verification indicates) that the credential is valid and to cease processing the message when the response indicates (or the verification indicates) that the credential is invalid.

Figure 3:
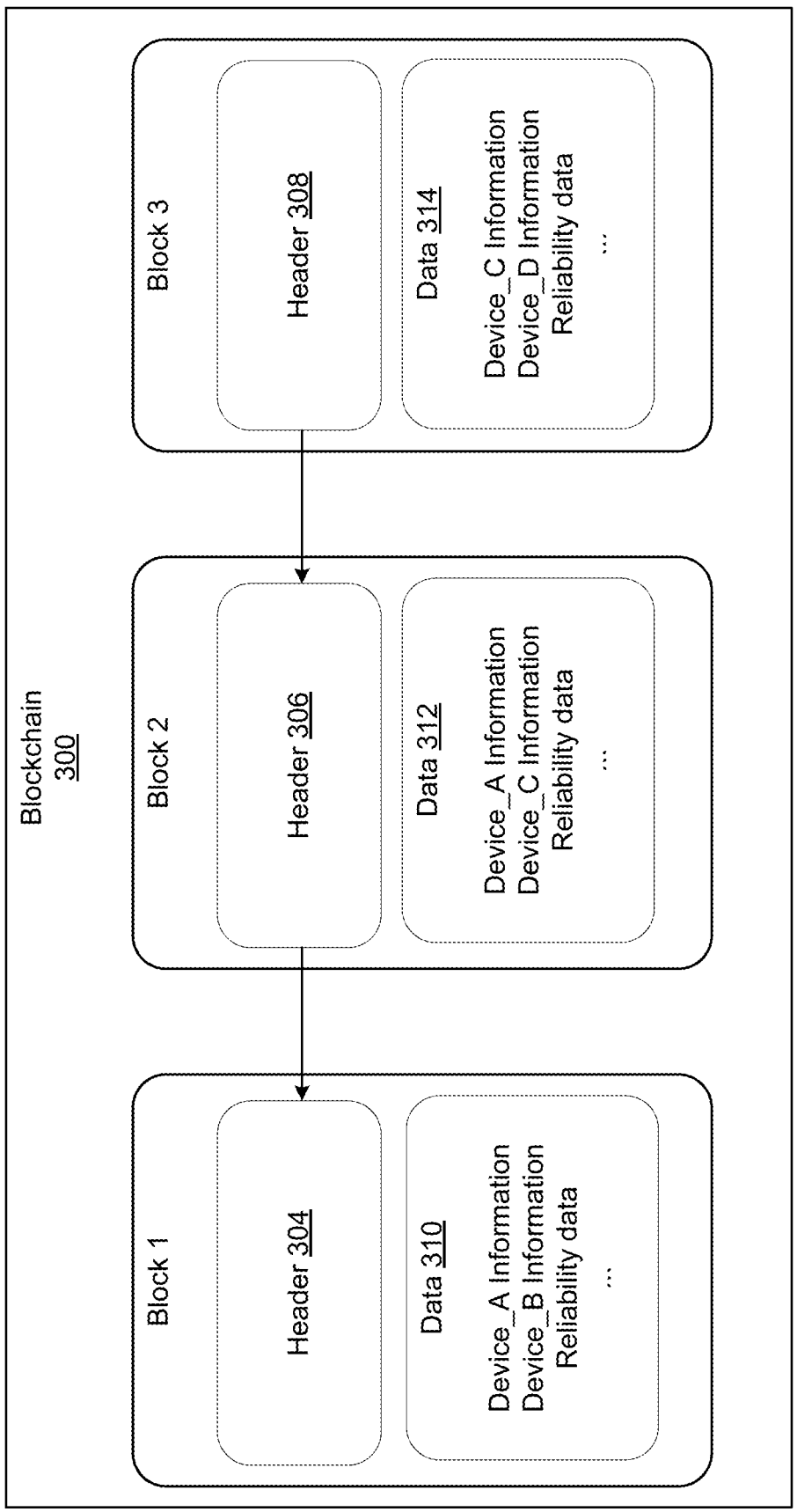
FIG. 3 depicts an example of a portion of a blockchain according to some embodiments.

FIG. 3 depicts an example of a portion of a blockchain 300 according to some embodiments. The blockchain 300 may be an example of the distributed database 114 of FIG. 1 and the distributed database 220 of FIG. 2. The portion of a blockchain 300, may include a number of blocks 1, 2, 3, each block including respective headers 304, 306, and 308. Each header may include data elements including version numbers, previous block hashes, merkle roots, and timestamps. Each block may also include reliability association data.

For example, data 310 may include Device_A Information. Device_A Information may be the serial number, network address, device name or any suitable information associated with Device_A (e.g., the computing device 105 of FIG. 1). The data 310 may further include Device_B Information. Device_B Information may be the serial number, network address, device name or any suitable information associated with Device_B (e.g., the computing device 103 of FIG. 1). The existence of Device_A information and Device_B information may serve as a mechanism to indicate that a local reliability relationship exists between Device_A and Device_B. Specifically, that Device_A has assessed the reliability of Device_B and considers Device_B to be reliable (e.g., trustworthy). In some embodiments, the data 310 may additionally include a reliability data. The reliability data may include any suitable attribute describing the relationship/association between Device_A and Device_B. For example, the reliability data may include an amount of reliability associated with Device_B. In some examples, a high reliability value indicates a higher degree of trust, whereas a low reliability value indicates a low degree of trust. In some embodiments, the reliability data may further specify that the Device_B is reliable under particular specified conditions. As a non-limiting example, the Device_B may be reliable from the perspective of Device_A for exchanging certain sensitive information, but unreliable for other types of sensitive information.

Data 312 and data 314 may include similar information detailing additional reliability associations between a pair of devices. Any suitable number of blocks may be included in the blockchain 300, each block corresponding to a device for which generated input has been provided. The blockchain may be accessible each of the computing devices of FIG. 1 and/or the computing device 202 of FIG. 2.

Figure 4:
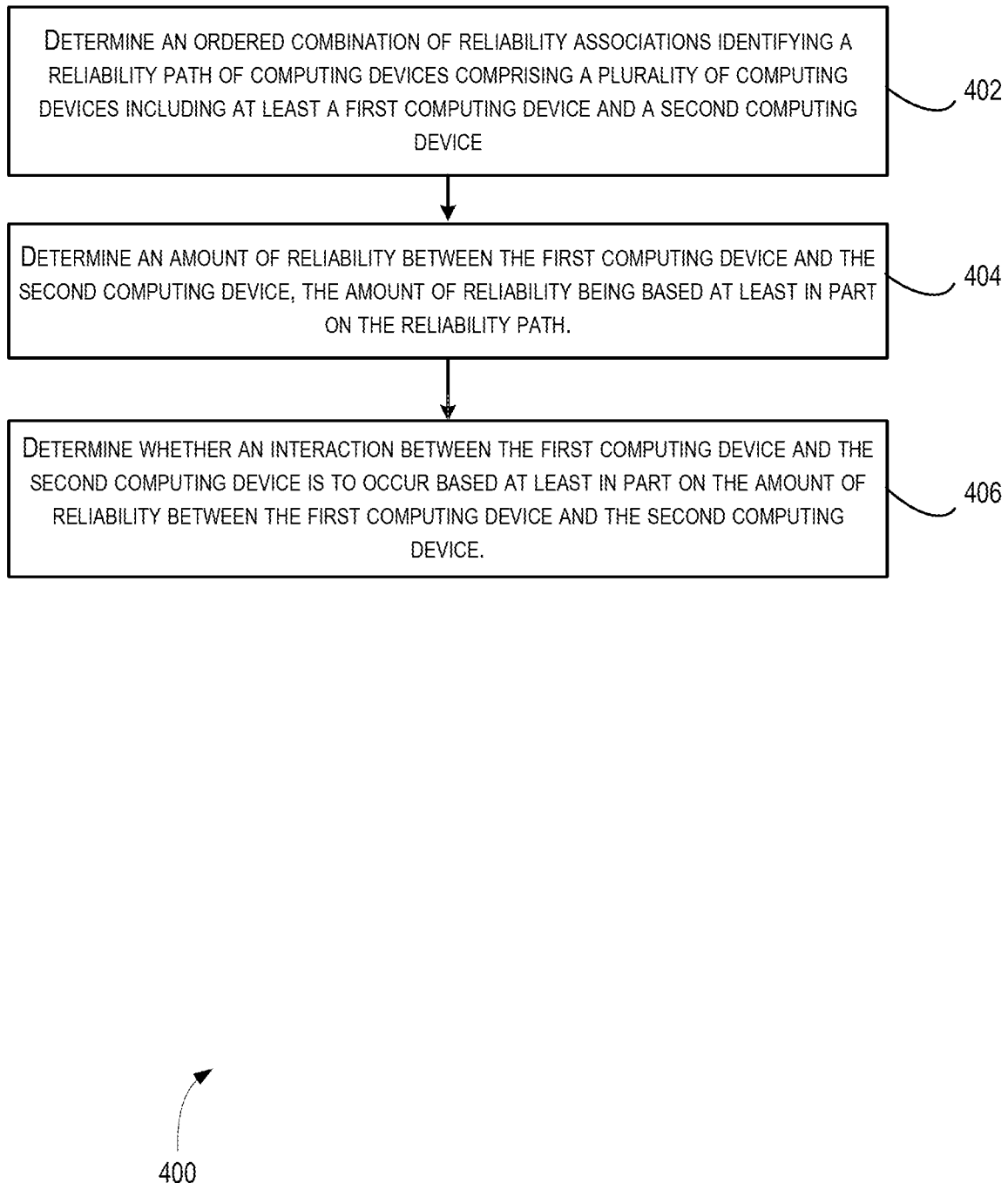
FIG. 4 depicts a flow diagram for an exemplary method for determining an amount of reliability of a computing device, according to some embodiments.

FIG. 4 depicts a flow diagram for an exemplary method 400 for determining an amount of reliability of a computing device, according to some embodiments. The method 400 may begin at 402 where an ordered combination of reliability associations may be determined. The ordered combination of reliability associations may identify a reliability path of computing devices comprising a plurality of computing devices including at least a first computing device and a second computing device. It may be the case that the first computing device and the second computing device are not directly connected and/or have not prescribed to a common authentication and/or trust scheme. In some embodiments, the ordered combination may be determined (e.g., utilizing the reliability determination module 216 of FIG. 2) using a protocol set (e.g., a smart contract) that is included as a feature of a distributed database (e.g., the distributed database 220 of FIG. 2, the blockchain 300 of FIG. 3, etc.). In some embodiments, the ordered combination may be determined by the first computing device and/or the second computing device (e.g., utilizing the reliability determination module 216 of FIG. 2) utilizing a distributed database (e.g., the distributed database 220, the blockchain 300 of FIG. 3, etc.) that is configured to store a plurality of reliability associations. An example of an ordered combination is depicted in reliability path 116 in FIG. 1, where the ordered combination for a communication from computing device 105 to computing device 112 includes R8, R2, R3, R13, R22.

At 404, an amount of reliability between the first computing device and the second computing device may be determined. In some embodiments, the amount of reliability may be based at least in part on the reliability path (e.g., the reliability path 116 and/or the reliability path 118 of FIG. 1). By way of example, the reliability determination module 216 may cause code associated with a protocol set (e.g., a smart contract) of the distributed database 220 to be executed. The execution of the protocol set code may cause a processor to determine a plurality of reliability associations that provide a path of associations (e.g., a reliability path) between the computing devices. In other embodiments, the reliability determination module 216 may itself be configured to cause the processor 204 to determine the reliability path by searching through all, or some portion, of the records contained in the distributed database 220.

In some examples, the amount of reliability may be based on a length of the reliability path (e.g., a number of computing devices included in the path). In some cases, if the number of computing devices of the reliability path exceeds a threshold value (e.g., five, ten, six, 50, etc.) then the computing device in question (e.g., the second computing device) may be deemed unreliable. In some embodiments, the amount of reliability may be based on determining a number of commonly trusted computing devices within the reliability path. For example, referring to FIG. 1, if the computing device 105 and the computing device 112 both trusted one or more of the computing devices 102, 101, 103, and/or 108, the amount of reliability may be higher than if the computing device 105 and the computing device 112 did not have common trust associations with any of the computing devices 102, 101, 103, and/or 108. Thus, the amount of reliability between two computing devices may be increased for each commonly trusted computing device in the reliability path.

In some embodiments, reliability data (e.g., included in data 310) may be used to determine the amount of reliability. For example, the reliability data may include information such as an amount of reliability assigned one party by another. Reliability data may further include particular scenarios or conditions by which one party believe the other is reliable, and/or particular scenarios or conditions by which one party believes the other is unreliable.

As an illustration, reliability path 116 for computing device 105 to communicate with computing device 112 in FIG. 1 may have local reliability associations R8, R2, R3, R13, R22. In some embodiments, the amount of reliability associated with this reliability path 116 may be determined by attributes of the local reliability associations as well as by a value (e.g., 5) corresponding to number of computing devices included in the reliability path 116. In other embodiments, for example, a local reliability association can be assigned a reliability score based on a scale of 1-10, with 1 being very untrustworthy and 10 being very trustworthy. The reliability score may be based on any suitable data such as, the reliability data included in data 310 within blockchain 300 of FIG. 3. The local reliability associations R8, R2, R3, R13, R22 may have reliability scores of 10, 8, 5, 10, and 9, respectively. The reliability scores for each local reliability association may be generated according to a scoring protocol that specifies weights corresponding to various attributes of the reliability data and a manner in which these weights are to be combined to provide a reliability score (e.g., an amount of reliability). In a simple example, the amount of reliability for the reliability path 116 could simply be the sum total of the reliability scores of each local reliability association included in the reliability path 116, divided by the number a local reliability associations in the reliability path 116. This method of calculation would return an amount of reliability corresponding to 8.4 (out of 10, for example) for reliability path 116. A predetermined threshold may be set such as to whether or not the reliability path 116 is reliable based upon the amount. For example, the system as a whole may determine that a threshold score of 7.0 or more indicates that a path is reliable.

Note that other logic may be used as well in determining the amount. For example, the amount of reliability of the reliability path may be lowered if one local reliability association has a very low reliability score, even though other local reliability associations have high reliability scores. The one very low local reliability score may indicate that the entire reliability path may be not reliable. For instance, if three local reliability paths have a score of 9, but one local reliability path has a score of 1, then the entire reliability path may be deemed untrustworthy because the one very low local reliability score falls below a minimum threshold of reliability.

At 406, the first computing device or the smart contract associated with the distributed database may determine whether an interaction between the first computing device and the second computing device is to occur. In some embodiments, this determination may be based at least in part on the amount of reliability between the first computing device and the second computing device. If the amount of reliability returned/determined meets or exceeds a threshold value, then the determination may be that the interaction is to occur (e.g., is allowed to occur). If the amount of reliability returned/determined does not meet the threshold value, then the determination may be that the interaction is not to occur (e.g., is restricted from occurring).

Figure 5:
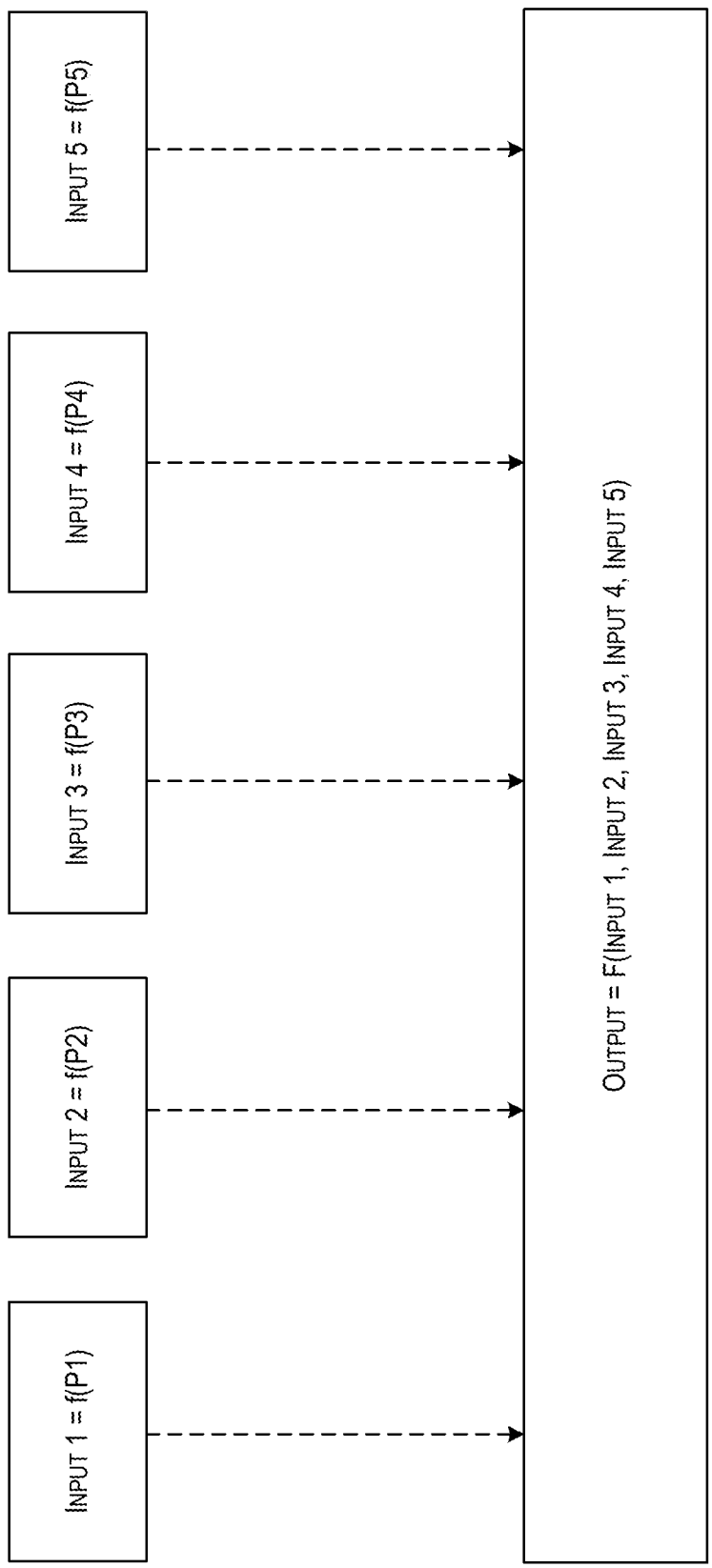
FIG. 5 depicts a block diagram of an exemplary process for generating a credential, according to some embodiments.

FIG. 5 depicts a block diagram of an exemplary process 500 for generating a credential (e.g., a symmetric key), according to some embodiments. Individual computing devices of computing device 101-113 of FIG. 1 may be configured to provide inputs 1-5. By way of example, computing device 105 may be configured to cause its processor to generate input 1. Input 1 may be computed based on a function (e.g., function "f") and a private key associated with the computing device 105 (e.g., P1). Similarly, processors of the computing device 102, the computing device 101, the computing device 103, the computing device 108, may be configured to generate input 2, input 3, input 4, and input 5, respectively. Inputs 2-5 may be generated utilizing the same (or different) function and a corresponding private key associated with each device (e.g., P2, P3, P4, and P5, respectively). In other examples, the inputs may be generated based on any suitable function and/or data specific to a computing device.

An output (e.g., a symmetric key) may be generated using a function "F" and two or more of the inputs. As depicted in FIG. 3, the function F may utilize input 1, input 2, input 3, input 4, and input 5, in that order, as input variables. The function "F" may be predetermined, or the function "F" may vary as specified within a protocol set (e.g., the protocol set associated with the distributed database 220 of FIG. 2 for example). The order and/or combination of the inputs to be utilized with the function "F" may also be specified within the protocol set. Although in this example, all five inputs may be utilized, it should be appreciated that any suitable number (e.g., two or more) of the inputs may be utilized. Thus, the output may be generated using 2, 3, or 4 of the inputs for example.

In some embodiments, the protocol set may define the number of inputs and the manner in which they are to be utilized to generate a symmetric key. For example, the protocol set may specify that for a path of five devices, the first device in the reliability path is to provide Input 1, the second device in the reliability path is to provide Input 2, the third device in the reliability path is to provide Input 3, the fourth device in the reliability path is to provide Input 4, and the fifth device in the reliability path is to provide Input 5. In some embodiments, the function "F" and/or the particular number and/or order of the inputs may be specified within the protocol set. In some examples, the protocol set specify a combination/order of inputs (e.g., Input 1, Input 2, and Input 3) to be utilized. For example, the protocol set could require that Input 3, Input 2, and Input 5, respectively are used as input in function "F" to generate a symmetric key.

As described, some embodiments of the invention may involve implementing one or more functions, processes, operations, or method steps. In some embodiments, the functions, processes, operations, or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:
1. A method, comprising:
obtaining, by a first computing device, a plurality of reliability associations from a distributed database, each of the plurality of reliability associations indicating a degree of trust between two computing devices;

determining, by the first computing device, a reliability path between the first computing device and a second computing device based at least in part on the plurality of reliability associations, the first computing device being unknown or having no previous relationship to the second computing device, and the reliability path comprising a sequence of computing devices including the first computing device, two or more other computing devices different from the second computing device, and the second computing device;

obtaining, by the first computing device, a protocol set for generating a symmetric key based at least in part on respective inputs provided by the computing devices of the reliability path, the protocol set defining a plurality of functions, each of the plurality of functions defining a number and a corresponding order of the respective inputs to be used to generate the symmetric key;

receiving, by the first computing device, the respective inputs provided by the computing devices of the reliability path;

generating, by the first computing device, the symmetric key based at least in part on a function defined by the protocol set and selected from among the plurality of functions, the function utilizing a combination of the respective inputs provided by the computing devices of the reliability path, the function being selected from the plurality of functions based at least in part on a length of the reliability path; and utilizing, by the first computing device, the symmetric key to encrypt and decrypt data communicated between the first computing device and the second computing device.

2. The method of claim 1, wherein different functions are utilized over time to generate symmetric keys based at least in part on the protocol set.

3. The method of claim 1, wherein a number of the respective inputs utilized to generate the symmetric key differs over time according to the protocol set.

4. The method of claim 1, wherein the protocol set identifies an input corresponding to a specific computing device having a particular position within a given reliability path is to be utilized for a particular variable of the function.

5. The method of claim 1, wherein the distributed database is stored on a blockchain that is accessible to the first computing device.

6. The method of claim 1, wherein the distributed database stores the protocol set, and wherein the protocol set specifies instructions for determining the reliability path, instructions for assessing an amount of reliability of a particular computing device based on a given reliability path, and instructions for generating the symmetric key.

7. The method of claim 1, further comprising:
providing, by the first computing device to the distributed database, information identifying one or more reliability associations that are established between the first computing device and one or more computing devices, wherein providing the information identifying the one or more reliability associations to the distributed database causes the distributed database to store the information.

8. The method of claim 1, wherein the second computing device is configured to generate the symmetric key according to the function, and wherein the second computing device encrypts data transmitted to the first computing device with the symmetric key.

9. A computing device comprising:
a hardware processor, and
a non-transitory computer readable medium coupled to the hardware processor, the non-transitory computer readable medium comprising code for causing the hardware processor to perform operations comprising:
obtaining a plurality of reliability associations from a distributed database, each of the plurality of reliability associations indicating a degree of trust between two computing devices;
determining a reliability path between the computing device and a second computing device based at least in part on the plurality of reliability associations, the computing device being unknown or having no previous relationship to the second computing device, and the reliability path comprising a sequence of computing devices including the computing device, two or more other computing devices different from the second computing device, and the second computing device;
obtaining a protocol set for generating a symmetric key based at least in part on respective inputs provided by the computing devices of the reliability path, the protocol set defining a plurality of functions, each of the plurality of functions defining a number and a corresponding order of the respective inputs to be used to generate the symmetric key;
receiving, by the computing device, the respective inputs provided by the computing devices of the reliability path;
generating, by the computing device, the symmetric key based at least in part on a function defined by the protocol set and selected from among the plurality of functions, the function utilizing a combination of the respective inputs provided by the computing devices of the reliability path, the function being selected from the plurality of functions based at least in part on a length of the reliability path; and
utilizing, by the computing device, the symmetric key to encrypt and decrypt data communicated between the computing device and the second computing device.

10. The computing device of claim 9, wherein different functions are utilized over time to generate symmetric keys based at least in part on the protocol set.

11. The computing device of claim 9, wherein a number of the respective inputs utilized to generate the symmetric key differs over time according to the protocol set.

12. The computing device of claim 9, wherein the protocol set identifies an input corresponding to a specific computing device having a particular position within a given reliability path is to be utilized for a particular variable of the function.

13. The computing device of claim 9, wherein the distributed database is stored on a blockchain that is accessible to the computing device.

14. The computing device of claim 9, wherein the distributed database stores the protocol set, and wherein the protocol set specifies instructions for determining the reliability path, instructions for assessing an amount of reliability of a particular computing device based on a given reliability path, and instructions for generating the symmetric key.

15. The computing device of claim 9, wherein the hardware processor performs further operations comprising providing, to the distributed database, information identifying one or more reliability associations that are established between the computing device and one or more computing devices, wherein providing the information identifying the one or more reliability associations to the distributed database causes the distributed database to store the information.

16. The computing device of claim 9, wherein the second computing device is configured to generate the symmetric key according to the function, and wherein the second computing device encrypts data transmitted to the first computing device with the symmetric key.

* * * * *